US006799480B1

(12) United States Patent
Walsh et al.

(10) Patent No.: US 6,799,480 B1
(45) Date of Patent: Oct. 5, 2004

(54) SCREWDRIVER WITH TORQUE MEASURING SCALE AND METHOD OF MAKING SAME

(75) Inventors: James M. Walsh, Racine, WI (US); Chad E. Ryshkus, Oak Creek, WI (US)

(73) Assignee: Pilling Weck Incorporated, Horsham, PA (US)

( * ) Notice: Subject to any disclaimer, the term of this patent is extended or adjusted under 35 U.S.C. 154(b) by 0 days.

(21) Appl. No.: 10/371,896

(22) Filed: Feb. 24, 2003

(51) Int. Cl.[7] .................................... G01L 5/24
(52) U.S. Cl. .................................... 73/862.21
(58) Field of Search .................. 73/862.21; 81/52–186, 81/468; D08/82

(56) References Cited

U.S. PATENT DOCUMENTS

| | | | | | |
|---|---|---|---|---|---|
| 2,400,978 | A | * | 5/1946 | Collins | 73/862.21 |
| 2,417,402 | A | * | 3/1947 | Storrie | 73/862.21 |
| 2,558,158 | A | * | 6/1951 | Rock | 81/438 |
| 2,607,219 | A | | 8/1952 | Millard | |
| 2,707,893 | A | | 5/1955 | Bonnet | |
| 3,783,682 | A | * | 1/1974 | Lipari | 73/862.23 |
| 4,063,474 | A | * | 12/1977 | Klopping | 81/474 |
| 4,901,610 | A | * | 2/1990 | Larson et al. | 81/473 |
| 5,048,381 | A | * | 9/1991 | Allen et al. | 81/477 |
| 5,129,293 | A | * | 7/1992 | Larson et al. | 81/483 |
| 5,239,875 | A | * | 8/1993 | Stasiek et al. | 73/862.23 |
| 5,435,190 | A | * | 7/1995 | Jansson et al. | 73/862.23 |
| 5,458,604 | A | * | 10/1995 | Schmieding | 606/104 |
| 5,535,867 | A | * | 7/1996 | Coccaro et al. | 81/477 |
| 5,546,816 | A | | 8/1996 | Jansson | |
| 5,576,501 | A | * | 11/1996 | Huang | 73/862.23 |
| 5,797,918 | A | * | 8/1998 | McGuire et al. | 81/450 |
| 6,155,147 | A | * | 12/2000 | Dzieman | 81/473 |
| 6,334,377 | B1 | * | 1/2002 | Wu | 81/478 |
| 6,463,834 | B2 | * | 10/2002 | Kemp et al. | 81/483 |
| 6,487,943 | B1 | | 12/2002 | Jansson | |
| 6,640,674 | B1 | * | 11/2003 | Rinner et al. | 81/475 |

* cited by examiner

*Primary Examiner*—Edward Lefkowitz
*Assistant Examiner*—T Miller
(74) *Attorney, Agent, or Firm*—Arthur J. Hansmann

(57) ABSTRACT

A screwdriver with a spring and a torque measuring scale and a limit stop, useful in the medical arts. A connector provides attachment to a workpiece tool and to a screw which, when fastened, non-rotatably holds the connector which in turn pilots a handle for the driving rotation of the screwdriver. The handle is short and the spring is a helical spring. A method of assembling the screwdriver is disclosed along with the embodiment disclosure.

13 Claims, 2 Drawing Sheets

Fig.5
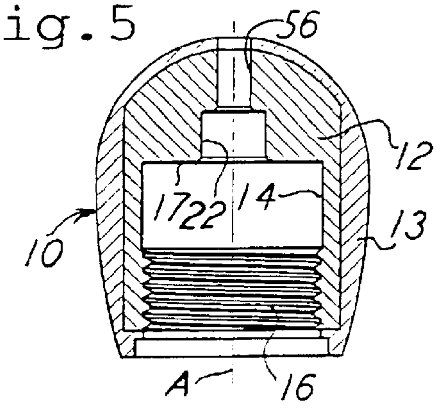
Fig.9
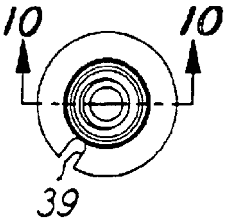
Fig.10
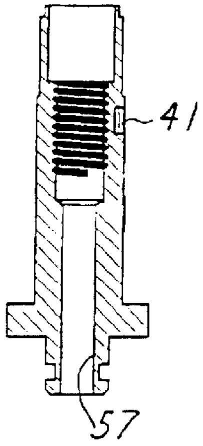
Fig.7
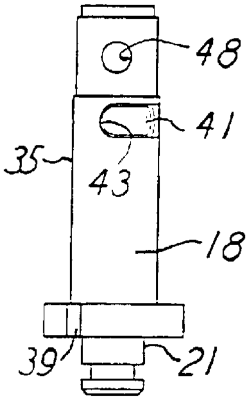
Fig.6
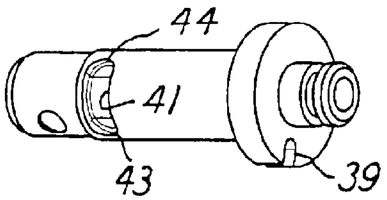
Fig.8
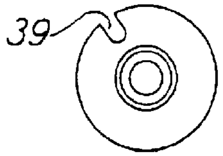
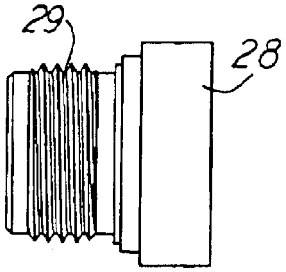
Fig.11
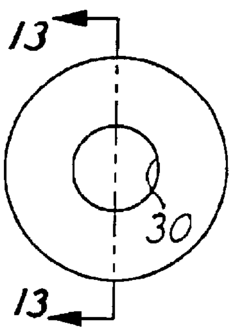
Fig.12
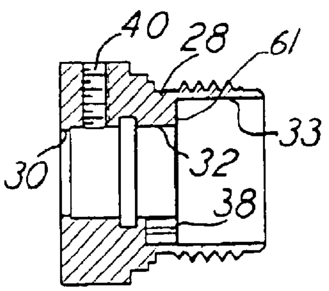
Fig.13

SCREWDRIVER WITH TORQUE MEASURING SCALE AND METHOD OF MAKING SAME

This invention relates to a screwdriver with a torque measuring scale and method of making the screwdriver, more particularly, it relates to the assembled parts which constitute the screwdriver for transmitting variable torque to a screw and for revealing and thereby measuring the magnitudes of those torques.

BACKGROUND OF THE INVENTION

The prior art is already aware of screwdrivers which transmit various amounts of torque and measure those torques. They employ springs through which the torque is transmitted from a screwdriver handle to the screw and they do so by virtue of inducing tension in the spring when the handle is turned against resistance from the driven screw. A scale on the screwdriver reveals the amount of torque being applied to the screw.

Because of the inherent elasticity in the torquing spring, it is important the assembly with the spring be of an optimum arrangement to assure repeated usefulness of the screwdriver and repeated accuracy of torque indication.

The present invention achieves the aforementioned objectives in that it provides a screwdriver assembly wherein the spring and the mounting thereof result in the screwdriver providing accuracy in torque indication. Further, the accuracy is achievable in repeated uses and over a range of applied torques.

Further, this invention provides the screwdriver with features mentioned above and it does so with a screwdriver handle which is ergonomically appealing in its fit with the hand of the user such that maximum torque can be exerted by the hand and onto the screwdriver handle. Also, the handle provides for forceful gripping, even if and when itinerant liquid is on the handle. The strength of the spring, that is, the resistance of the spring during torquing, is selected to be compatible with the usual strength of an ordinary user's hand. The handle is of a size so that it fits completely into the palm and fingers of the user's hand.

Still further, the screwdriver of this invention is fluid-tightly sealed against entry of foreign matter for deposit between the moving parts, and thus the screwdriver maintains its accuracy and sterility for use in the medical field, such as in applications relative to bone screws.

Additionally, the screwdriver of this invention is readily and easily assembled, and it has a minimum of parts, and thus there is little opportunity for tampering which can upset the sealed condition or the accuracy of the torque production.

Even more so, the screwdriver of this invention is arranged for ready and accurate calibration and for limiting the amount of measurable torque transmitted and thereby avoid damage to the instrument. This is accomplished by employing a limit stop for governing the maximum amount of measurable torque, and there is a lost motion connection through which the torque can be transmitted.

Other objects and advantages will be apparent upon reading the following description in conjunction with the accompanying drawings.

BRIEF DESCRIPTION OF THE DRAWINGS

FIG. 5 is a sectional view like that of FIG. 4 but showing only the handle.

FIG. 6 is a perspective view of a part shown in FIG. 1.

FIG. 7 is a side elevational view of FIG. 6.

FIGS. 8 and 9 are end views of FIG. 7.

FIG. 10 is a sectional view taken on a plane designated by the line 10—10 of FIG. 9.

FIG. 11 is a side elevational view of a part in FIG. 1 but from the side opposite from that of FIG. 1.

FIG. 12 is an end elevational view of FIG. 11.

FIG. 13 is a sectional view taken on a plane designated by line 13—13 of FIG. 12.

DESCRIPTION OF THE EMBODIMENT AND METHOD

Figure 1:
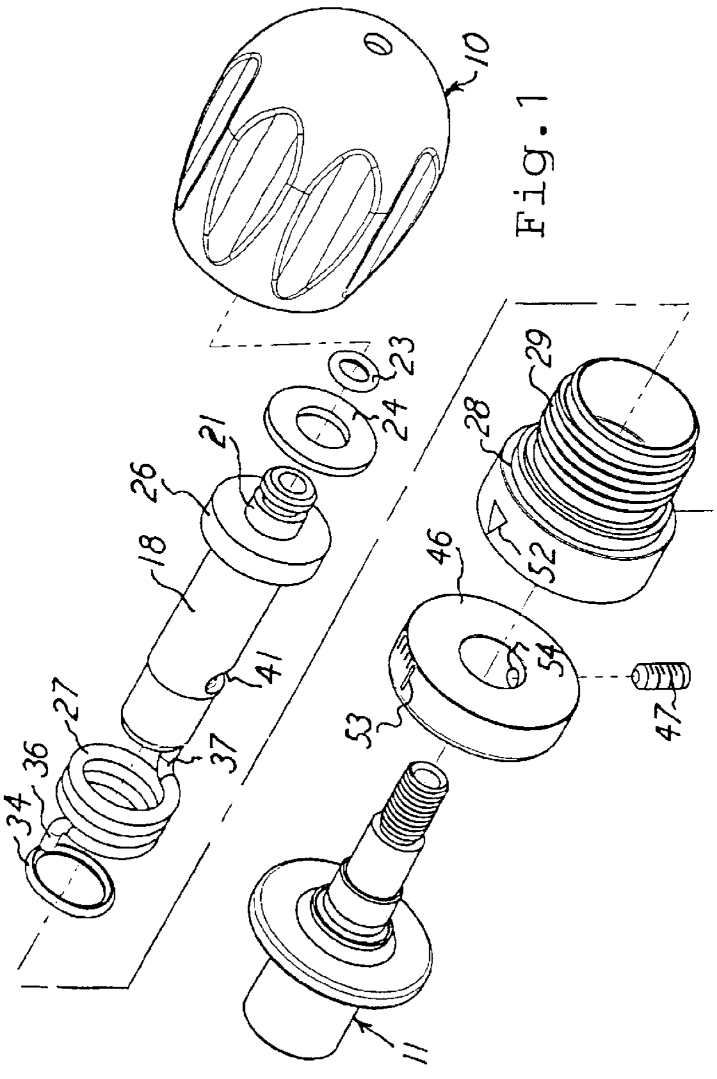
FIG. 1 is a rear exploded perspective view of the screwdriver of this invention.

This screwdriver is arranged with a scale to reveal the amount torque being applied to a screw. It has an ergonomically presented handle with a rigid core and a cushioned cover, such as of silicone, and the handle is egg-shaped and contains parts in a liquid-tight and debris-free manner. It is arranged to provide for accurate and ready setting of the "zero" starting position. There is a limited lost-motion feature which allows for the application of readable torque and also for limiting travel of the parts so that the instrument, particularly the spring, is not over strained. Adapters of varying capacity for attaching tools can be separately attached to the screwdriver. Throughout, the method of making the screwdriver is disclosed in the following description of the parts and their assemblage.

The first sheet of drawings shows the screwdriver of this invention which includes a handle 10 and a tool adapter 11 which is releasably threadedly connected thereto. Various conventional adapters, such as adapter 11, can be connected with the handle 10 to accommodate and support various tools which are conventional but are not shown herein. The instrument's usefulness can be in the medical arts field for turning bone screws or the like.

The first sheet of drawings is comprehensive in showing the invention, so initial attention is directed mainly to those showings. The handle 10 is egg-shaped and consists of an inner rigid and generally cup-shaped core 12, such as best delineated in FIGS. 4 and 5. A slightly pliable cover 13 is molded to, and extends over, the core 12 and is shaped to render firm and powerful optimum gripping by the user and to present an ergonomically shaped handle 10. The core 12 has a cylindrical hollow interior 14 with female threads 16 at one end, the head end, and a countersunk end wall 17 at the other end, the butt end.

Figure 4:
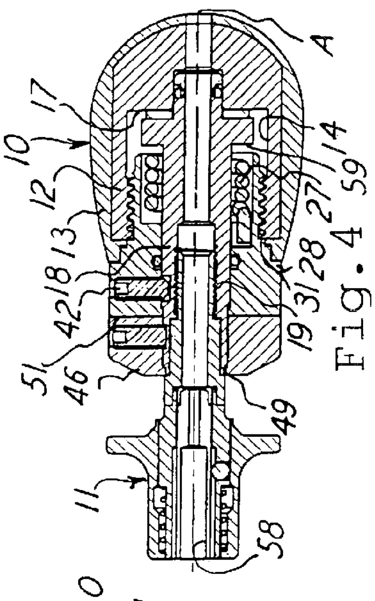
FIG. 4 is a sectional view taken on a plane designated by line 4—4 of FIG. 3.

The core 12 and the cover 13 extend along the longitudinal axis A for substantially the same axial distance, and the total extent is substantially the same as the largest diametrical distance across the cover 13, as seen in FIG. 4. Thus, the external shape of the handle 10 is substantially spherical, and is herein also referred to as egg-shaped and it is palm-type in that it can be fully nested in the palm of the user's hand.

A cylindrically shaped adapter connector 18 is disposed in the handle hollow interior 14 and extends along the axis A and is shown to extend beyond the handle 10. The adapter 11 is shown to be threadedly connected to the connector 18 through mutual threads at 19. A circular end 21 on the connector 18 extends into a circular opening 22 in the handle core 12, and the handle 10 can rotate on the end 21. An O-ring seal 23 and a washer 24 are shown to intervene. There is a flange 26 on the connector to present axial abutment between the connector 18 and the handle end wall 17.

A cylindrical helical spring 27 is disposed in the handle interior 14, and the spring surrounds the connector 18, to the extent indicated. A sleeve 28 extends into the handle 10 and has threads 29 which engage the handle threads 16, and the sleeve 28 has a hollow circular interior 33 for receiving the spring 27. The handle core 12 and the sleeve 28 have abutting shoulders at 31 which set the axial positioning of the sleeve on the handle 10. Also, the sleeve 28 has circular interior walls 30 and 32 which are piloted on the connector 18 for rotation relative thereto, and at least the connector circumference 35 presents rotation contact with the circular wall 32. The sleeve 28 is considered to be a portion of and an extension of the handle 10, and they rotate in unison about axis A. An O-ring 34 seals between the connector 18 and the sleeve 28.

The spring 27 has two ends 36 and 37 which extend parallel to the axis A, and the spring ends are anchored respectively in the sleeve 28 and the connector 18 by projecting into respective openings 38 and 39. In those manners, the spring 27 is interconnected between the handle 10 and the connector 18 for receiving torsional force upon rotation of the handle 10 relative to the connector 18 which is stationary when the unshown attached screw is fastened tightly into its workpiece. In that tightening function, the spring 27 rotated clockwise from a right end view of FIG. 1, and it is thereby tightened onto itself to transmit a measurable torque being applied to a fastened screw.

The relative rotation between the handle portion 28 and the connector 18 is a limited and lost motion relationship. Thus, the connector has a circumferential slot 41 and the portion 28 has a threaded opening 40 fixedly receiving a pin 42 which extends into the slot 41, as seen in FIG. 4. It will be understood that the connector 18 is affixed with the adapter 11 which in turn will be affixed with an unshown screw but one which is being tightened by this screwdriver with clockwise rotation as viewed from the right end of FIGS. 1 and 4. The user's hand rotation forces on the handle 10 to cause the handle to be urged clockwise and thereby rotate the pin 42 along the slot 41 when the pin was initially adjacent the end wall 43 of the slot 41. The slot 41 extends circumferentially for only a minor fraction of the circumference of the connector 18, so the maximum amount of lost motion is that fractional amount. When the pin 42 reaches the slot end wall 44, then the relative rotation between the handle 10 and the connector 18 is ended. The pin 42 is preferably threaded into the sleeve 28, and it could be pressed in.

In that clockwise rotation, the sleeve 28 rotates and carries the spring end 36 in the clockwise direction to thereby place torsion in the spring which is then tightening onto itself. The spring is shown to have only four full turns in it, and it is sufficiently stiff to transmit at least 20 inch/pounds of torque in only a fraction of a circle of rotation of the handle 10. Also, the spring 27 extends axially for only less than one-half the axial length of the handle 10, as seen in FIG. 4.

To measure and reveal the torque transmitted, a scale member 46, shown in the form of a ring, is affixed to the connector 18 by a set screw 47 extending into a hole 48 in the connector 18. Also, there is a shouldered stop at 49 between the ring 46 and the adapter 11, so the ring is retained against both rotational and axial movements, and the ring 46 is in contact with the sleeve 28 at the plane 51.

Figure 2:
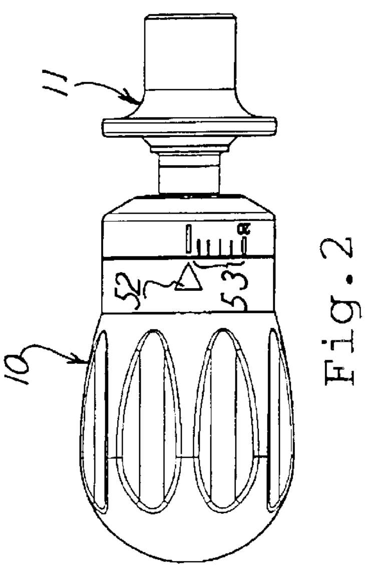
FIG. 2 is a side elevational view of the side opposite from FIG. 1 and with the screwdriver fully assembled.

The sleeve 28 has an indicia in the form of a mark 52, and the ring 46 has indicia in the form of a scale 53 showing a measurement up to 20 inch/pounds. FIG. 2 then readily shows that the rotation of the handle, against the resistance of a screw which is being tightened, will register a torque reading on the scale 53 because of the mark 52 which is rotating adjacent the scale 53. The pin or set screw 42 and the slot wall 43 can be initially positioned adjacent each other, and the ring hole 54 will be disposed relative to the slot 41 while the spring 27 is free of tension which would register a reading on the scale 53. Of course the marks 52 and 53 will be aligned with each other for a "Zero" starting setting, and, due to appropriate spring elasticity, the spring 27 will always return the alignment to "Zero" in the absence of hand force on the handle 10.

Figure 3:
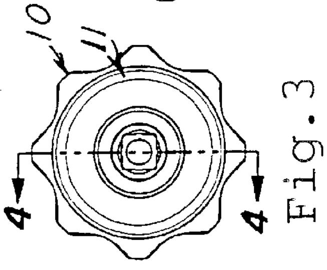
FIG. 3 is a right end elevational view of FIG. 2.

As seen in FIGS. 1 and 4, the set screws 42 and 47 are on a common radial plane, and thus the slot 41 and hole 54 are also. Then the indicia 52 and 53 are shown to be away from the set screws 42 and 47. It will also be understood the spring 27 is of a size and strength to accommodate the functions mentioned. The spring 27 has four turns in contact with each other, so it is short, and the ends 36 and 37 are shown diametrically opposite each other, all to fit the spring attachments locations on the connector 18 and the sleeve 28. The strength of the spring 27 will permit rotation of the handle up to the 20 inch/pound end of the scale 53, in response to the force applied by the user's hand. Also, the length of the slot 41 is sufficient to at least permit that maximum rotation. So the various parts are arranged and aligned to produce the initial "zero" setting in the alignment of the marks 52 and the first mark on the scale 53, as seen in FIG. 3, and the limit slot 41 and its pin 42 permit that maximum rotation and not substantially beyond the "20" reading, and thereby the screwdriver is not unduly strained.

Considering the handle as one part, there is a total of only six torque-effective parts with the handle 10, the connector 18, the helical spring 27, the scale member 46, and the the two set screws 42 and 47. The spring ends 36 and 37 are orientated parallel to the axis A, and they respectively slidingly mate with the housing recess 38 and the connector recess 39.

There is a passageway through the axial entirety of the screwdriver beacuse of axial opening 56 in the handle 10, axial opening 57 in the connector 18, and even axial opening 58 in the adapter 11, and even through the helical spring 27. So cannulation functions can be performed through the axial length of the screwdriver which has the short handle dexcribed and shown.

Other arrangements could be utilized, but the relationships for "zero" positioning, lost motion and its amount of angularity, limit stop and its limit location, and spring strength for accurate torque measurement should be satisfied.

It will be noticed that the handle core 12 has a cylindrical exterior while the handle cover 13 is molded thereover and is shaped to present the egg shape or bulbous shape for enhanced hand gripping. Also, the spring 27 is confined within that short handle 10, and it is not affixed in its attachment therein but instead has the spring ends 36 and 37 in sliding engagement in the recesses 38 and 39. To effect that arrangement, the spring 27 is confined and flanked by a sleeve wall 61 and a wall 59 on the connector 18, and those two walls face each other and are spaced apart along axis A. That precludes movement of the spring 27 along the axis A. That arrangement avoids damaging, bending, and shearing stresses on the spring when it is subjected to repeated torsional forces in normal repeated use.

The method of making the screwdriver assembly is disclosed in the foregoing, and the sequence of assembly can follow that description. Changes can be made in both the embodiment and the method, and the scope of the invention is defined by the claims.

What is claimed is:

1. A screwdriver assembly for rotationally driving a tool to thereby threadedly fasten a workpiece screw and having a torque measuring scale, comprising:

a screwdriver handle having an elongated axis and a hollow interior along said axis and a recess in said handle, a helical spring disposed in said handle interior and extending axially therealong and having two ends with a first one of said spring ends disposed in said handle recess for rotation-connection with said handle, a connector supported on said handle for rotation of said handle relative to said connector which has a recess therein and a second end of said spring is disposed in said connector recess to have said second end of said spring non-rotationally connected to said connector, said spring two ends being axially movable in said recesses for accommodating extension and contraction of said spring and said handle and said connector each being arranged adjacent said ends of said spring for limiting axially movement of said spring, said connector being adapted to connect with an adapter for supporting a tool for tightening the workpiece screw, a torque scale connectable with said connector and being co-axially disposed relative to said axis, and a marker on said handle adjacent said scale and rotatable with said handle for indicating the amount of rotation of said handle relative to said scale upon tightening the screw.

2. The screwdriver assembly for rotationally driving a tool to thereby threadedly fasten a workpiece screw and having a torque measuring scale, as claimed in claim 1, including:

said handle and said connector each having a wall adjacent and respectively at opposite said ends of said spring and facing said spring for confining said spring along said axis.

3. The screwdriver assembly for rotationally driving a tool to thereby threadedly fasten a workpiece screw and having a torque measuring scale, as claimed in claim 1, including:

a lost motion connection interposed between said handle and said connector for relative rotation therebetween, a limit stop included in said lost motion connection and being operative upon relative rotation of said handle and said connector for stopping the relative rotation, and said lost motion and said limit stop including a slot with two spaced-apart end walls on said connector and a pin on said handle and disposed in said slot and said pin and said slot being interrelated for relative rotational movement of said pin between said walls for the lost motion therebetween and for limiting the lost motion therebetween.

4. The screwdriver assembly for rotationally driving a tool to thereby threadedly fasten a workpiece screw and having a torque measuring scale, as claimed in claim 3, wherein:

said pin extends radially of said axis and said connector has a circumference and said slot extends circumferencially on said connector.

5. A screwdriver with a scale for measuring torque transmitted to a workpiece screw, comprising:

a handle having a longitudinal axis and a hollow interior extending along said axis, a helical-type spring disposed in said hollow interior and having two ends with a first one of said ends attached directly to said handle and a second one of said ends being connectable to the screw and having said handle rotatable relative to the screw, indicia on the screwdriver and respective to both said handle and said spring for measuring the relative rotation between said handle and said second one of said ends of said spring when the screw resists rotation, a rotationally operative lost motion connection interposed between said handle and said second one of said spring ends to accommodate the relative rotation, a limit stop included in said lost motion connection for stopping the relative rotation, and said lost motion connection and said limit stop including a slot with two spaced-apart end walls and a pin in said slot and said pin and said slot being interrelated for relative rotationally movement between said pin and said walls for lost motion therebetween and for limiting the rotational motion therebetween.

6. A screwdriver with a scale for measuring torque transmitted to a workpiece screw, comprising:

a connector with a circular surface and presenting a longitudinal axis, a handle having a longitudinal axis and a hollow interior extending along said handle axis and said handle being rotationally supported on said connector circular surface, a spring disposed in said hollow interior and having two ends with a first one of said ends connected with said handle and a second one of said ends being connectable to said connector and rotatable free of said handle for rotation of said handle relative to said second end, indicia on the screwdriver and respective to both said handle and said spring for measuring the relative rotation between said handle and said spring when the screw resists rotation, a connection having a rotationally operative lost motion and rotation limit stop and with said connection being interposed between said handle and said spring to accommodate and limit the relative rotation, and said connection being a slot in said connector with two spaced-apart end walls and a pin disposed on said handle and in said slot and said pin and said slot being interrelated for relative rotational movement between said pin and said walls for lost motion therebetween and for limiting the rotation motion therebetween.

7. The screwdriver with a scale for measuring torque transmitted to a workpiece screw, as claimed in claim 6, wherein:

said pin extends radially of said axis and said connector has a circumference and said slot extends circumferencially on said connector.

8. The screwdriver with a scale for transmitting torque to a workpiece, as claimed in claim 7, wherein:

said slot has two spaced-apart end walls and said pin and said slot are interrelated for relative rotational movement of said pin between said walls for lost rotational motion therebetween and for limiting the motion therebetween.

9. The screwdriver with a scale for transmitting torque to a workpiece, as claimed in claim 8, including:

said spring two ends being axially projecting ends and said handle and said connector having respective axially open recesses and with said ends axially movable disposed in said recesses and to have said spring through said projecting ends transmit torque between said handle and said connector.

10. The screwdriver with a scale for transmitting torque to a workpiece, as claimed in claim 6, including:

said handle having a center core of a cylindrical shape and a cover of an egg shape attached to and extending over said core and with the dimension of said handle along said axis being substantially the same as the dimension for the cylindrical shape for presenting a palm-grippable handle.

11. The screwdriver with a scale for transmitting torque to a workpiece, as claimed in claim 6, wherein:

said handle is rotationally piloted on said connector at a location along said axis, and said pin and said slot are located at said location.

12. A method of assembling a screwdriver having a torque measuring scale thereon, comprising the steps of:

providing a cylindrical helical spring extending along an axis and having two terminal ends extending in a direction of said spring axis, providing a handle and a connector to be rotatable relative to each other for rotation on said axis and with said handle and said connector each having a recess openly extending in the direction of said axis, moving together said spring and said handle and said connector along said axis and positioning said spring ends respectively into said recesses in the moving together along said axis to thereby have a respective one of said spring ends non-rotatably assembled with said handle and said connector and to transmit rotation between said handle and said connector through said spring, providing a rotational lost motion connection between said handle and said connector with regard to the rotation transmitted through said spring, and providing a rotation stop operative between said handle and said connector.

13. The method of assembling a screwdriver, as claimed in claim 12, including the step of:

rotationally piloting said handle on said connector along a length of said axis, and arranging said connection and said stop respectively as a pin and slot connection located at said length.

* * * * *